United States Patent [19]

Knott, II et al.

[11] Patent Number: 4,671,987

[45] Date of Patent: Jun. 9, 1987

[54] PRINTABLE COMPOSITE STRETCH WRAP FILM

[75] Inventors: Jack E. Knott, II, Barrington, Ill.; Kenneth W. Obitz, Huntington Beach, Calif.

[73] Assignee: El Paso Products Company, Odessa, Tex.

[21] Appl. No.: 848,556

[22] Filed: Apr. 7, 1986

[51] Int. Cl.$^4$ ...................... B32B 27/06; B65D 85/00
[52] U.S. Cl. .................................. 428/216; 428/484; 428/516; 428/517; 264/176.1; 426/127
[58] Field of Search ................ 428/484, 216, 516, 517

[56] References Cited

U.S. PATENT DOCUMENTS

| | | | |
|---|---|---|---|
| 4,379,197 | 4/1983 | Cipriani et al. ...................... | 428/220 |
| 4,425,268 | 1/1984 | Cooper ................................. | 524/110 |
| 4,430,457 | 2/1984 | Dobreski ............................. | 523/100 |
| 4,436,788 | 3/1984 | Cooper ................................. | 428/520 |

*Primary Examiner*—P. C. Ives
*Attorney, Agent, or Firm*—Fred S. Valles; Margareta LeMaier

[57] ABSTRACT

Printable high strength, thin stretch wrap composite films exhibiting excellent self-adherence without heat sealing are comprised of at least two layers, wherein one outside layer is comprised of a tackified ethylene-vinyl acetate copolymer and the other outside layer of a very low density polyethylene copolymer having a density below 0.915. Optionally, a third inside layer of liner low density polyethylene is present in the composite film.

13 Claims, No Drawings

PRINTABLE COMPOSITE STRETCH WRAP FILM

BACKGROUND OF THE INVENTION

The use of compositions based on conventional ethylene homopolymer or copolymers in the manufacture of stretch wrap films having good cling and optical properties is known, e.g., as shown in U.S. Pat. No. 4,073,782. This patent discloses stretch wrap films made from a ternary composition wherein the resin component is a polyethylene, a copolymer of ethylene and vinyl acetate, or a mixture of the above-mentioned polyethylene and copolymer. The remaining essential components of the ternary composition are sorbitan monooleate, which is mainly added as an antihazing agent, and a liquid paraffin, as an adhesiveness modifier. Although the films produced in accordance with the teachings of the aforementioned patent perform very well in some applications, their strength and toughness properties are generally not as good as would be desired.

The recently developed linear low density polyethylenes have the desired strength and toughness properties required from stretch wrap applications, but do not possess the required cling, which in the case of conventional polyethylene, can be partially obtained by incorporation of vinyl acetate as a comonomer.

U.S. Pat. No. 4,436,788 discloses a composite stretch wrap film constituted of a layer of ethylene-vinyl acetate copolymer containing a tackifier and a layer of linear low density polyethylene. Such a film exhibits a certain amount of adherence to itself, however, in certain applications requiring very thin films, acceptable adherence can be achieved only after applying heat to the overlapping wraps of the film.

The patent also discloses a three-layer stretch wrap film of improved cling properties constituted of an inner layer of linear low density polyethylene and the two outer layers of ethylene-vinyl acetate copolymer preferably containing a tackifier. It has been found that the presence of tackifier is necessary in both of the outer layers in order to provide sufficient cling. However, because of the presence of such a tackifier in the outer layers, it has not been possible to use this film in the manufacture of printed films of acceptable print quality. The tackifiers work by migrating to the surface of the film. Due to the presence of these tackifiers on the surface, it is impossible to hold a corona treatment level on the film which is necessary to wet out printing inks. Also, because the inner linear low density polyethylene layer by necessity must be very thin when the composite film is required to be of thin gauge, the strength of the stretch wrap is less than desired.

It is therefore an object of the present invention to provide a novel composite stretch wrap film which exhibits sufficient cling and strength without the necessity of heat treatment.

It is another object of the invention to provide a printable composite stretch wrap film exhibiting excellent cling properties even at thin film gauges.

Further objects of the invention will become apparent from a reading of the specification and appended claims.

THE INVENTION

In accordance with one embodiment of the present invention there is provided a composite film comprising (A) a first layer of a blend of
  (1) an ethylene-vinyl acetate copolymer (EVA) containing from about 2 to about 25 wt % of polymerized vinyl acetate groups and
  (2) a tackifier and
(B) a second layer comprised of at least 50 wt % of a very low density polyethylene (VLDPE) having a specific gravity of below 0.915 gms/cc.

In another embodiment of the present invention, there is provided a three-layer composite film further comprising an intermediate layer of linear low density polyethylene to provide a structure of tackified EVA/LLDPE/VLDPE.

The polymerized vinyl acetate content of the EVA copolymer is preferably maintained between about 4 and about 16%. The melt index of the EVA should be in the range of from about 0.1 to about 10 g/10 min and preferably between about 0.25 and about 4.

The tackifier to be used in the EVA resin can be any suitable tackifier known in the art. For instance, sorbitan monooleate, glycerol monooleate, low molecular weight polyisobutylene, amorphous polypropylene, polyterpenes, microcrystalline wax are among tackifiers useful in this invention. Typically, they are present in the EVA resin in concentrations between about 0.5 and about 6 wt %.

The VLDPE is a linear nonpolar polymer of narrow molecular weight distribution. It is a copolymer of ethylene and at least one comonomer selected from $C_4$ to $C_{10}$ alpha-olefins, the copolymer having a density of below 0.915, such as between 0.890 and below 0.915. The melt index of the VLDPE copolymer is in the range of from 0.1 to about 10g/10 min. The copolymer resins are commercially available and consequently, for the purpose of this invention, the process for their production need not be discussed. The VLDPE can be blended with from 0 to about 50 wt % of another ethylene polymer such as polyethylene homopolymer, ethylene-vinyl acetate copolymer, linear low density polyethylene, and mixtures of these compounds.

The linear low density polyethylene (LLDPE) used as an optional intermediate layer is a copolymer of ethylene with one or more comonomers selected from $C_4$ to $C_{10}$ alpha-olefins such as butene-1, hexene-1, etc. Preferably, the density should be maintained between 0.916 to 0.928 g/cc for film making purposes. The melt index should range between about 0.1 and 10 g/10 min and preferably between 0.5 and about 3.0 g/10 min. Such polymer resins are commercially available and are manufactured in low pressure vapor phase and liquid phase processes using transition metal catalysts.

Although the VLDPE resins used in one of the layers of the film is quite similar to a LLDPE resin in many respects, e.g., in linear structure, lack of long chain branching, etc., the difference in the catalysts and in process technologies used in the manufacture of the respective resins gives rise to an unexpected difference in cling characteristics. Specifically, while films produced from LLDPE resins do not posses any significant cling characteristics, those produced from VLDPE resins are sufficiently tacky that no extraneous tackifiers need to be added to provide the desired cling even at thin film gauges.

Various methods may be used for producing the composite films, e.g., by coextrusion of tackified EVA, LLDPE (optional) and VLDPE in known fashion. The total thickness of the film can be between about 0.2 and about 2 mil and should preferably be in the range of from about 0.3 to about 1.5 mil. The thickness of each layer should be at least 0.1 mil. Since the films of these inventions have greater tear and puncture resistance, tensile strength and elongation compared to films prepared from conventional low density polyethylene or ethylene-vinyl acetate copolymers, the film thickness can be considerably reduced at equivalent stretch wrap performance. In addition, the films are printable and have generally good optival qualities such as low haze levels and high gloss, and are resistant to fogging and can, therefore, also be used with advantage for wrapping of food to be displayed or stored in refrigerated cases. They are particularly suitable as self-adherent, thin, printed wraps for vegetables such as heads of lettuce, cauliflower, etc. The vegetables are advantageously wrapped with the film at the harvesting site.

The following example further illustrates the advantages of the invention.

EXAMPLE

A three layer composite film of 0.5 mil thickness was produced by coextrusion of layers of VLDPE, LLDPE (inner) and tackified EVA. The relative thicknesses of the layers were respectively 20%, 40% and 40%. The VLDPE resin was a commercially available product UCAR ® FLX Resin DFDA-1137 Natural 7 obtained from Union Carbide Corporation. The resin had a density of 0.906 gm/cc and a melt index of 0.8 gms/10 min. The LLDPE resin was obtained from Dow Chemical Company under the trade name Dowlex ® 2045. It had a density of 0.920 gms/cc and a melt index of 1.0 gms/10 min. The EVA resin was obtained from Norchem under the trade name 3043H. The resin had a density of 0.928 gms/cc, a melt index of 2.0 and contained about 4.5 wt % polymerized vinyl acetate. Polyisobutene was incorporated at about a 4 wt % level as a tackifier. Table I below lists the physical properties of the coextruded film.

TABLE I

| Optics | |
|---|---|
| Haze % | 2.3 |
| Gloss | 68.7 |
| Tensiles | |
| Elong | |
| MD % | 605 |
| TD % | 820 |
| Pull | |
| MD psi | 5685 |
| TD psi | 4150 |
| 1% Secant Modulus | |
| MD psi | 14535 |
| TD psi | 15885 |
| Coeff. of Friction | 0.63 |
| To Teflon | |
| Tear | |
| MD grams/mil | 249 |
| TD grams/mil | 628 |
| Spencer Impact grams/mil | +1935 |
| Melt Index grams/10 min | 1.5 |

Heads of lettuce were wrapped at ambient temperatures in 17"×17" squares of the film keeping the VLDPE layer on the outside. The film of all test samples adhered satisfactorily around the lettuce heads and none of the samples became unwrapped upon refrigerated storage and repeated handling. The same excellent results were obtained using corona discharge-treated printed film samples.

Various modificiations and alterations can be made to the films without departing from the scope of this invention, which is defined by the specification and appended claims.

What is claimed is:

1. A printable composite stretch-wrapp film comprising
   (A) a first layer of a blend of
      (1) an ethylene-vinyl acetate copolymer (EVA) containing from about 2 to about 25 wt % of polymerized vinyl acetate groups and
      (2) a tackifier; and
   (B) a second layer free of tackifier and comprised of at least about 50 wt % of a linear, nonpolar, very low density polyethylene (VLDPE) having a specific gravity of below 0.915 gms/cc.

2. The film of claim 1 further comprising an intermediate layer of linear low density polyethylene (LLDPE).

3. The film of claim 1 wherein the tackifier is selected from the group consisting of sorbitan monooleate, glycerol monooleate, low molecular weight polyisobutylene, amorphous polypropylene, polyterpenes and microcrystalline wax.

4. The film of claim 1 wherein the tackifier is present in blend (A) in amounts ranging from about 0.5 to about 6.0 wt %.

5. The film of claim 1 wherein the EVA contains between about 4 and about 16 wt % polymerized vinyl acetate groups.

6. The film of claim 1 wherein the VLDPE has a density ranging from about 0.90 and to below 0.915.

7. The film of claim 1 wherein the VLDPE of (B) is blended with from 0 to about 50 wt % of an ethylene polymer selected from the group connisting of polyethylene homopolymer, ethylenevinyl acetate copolymer, linear low density polyethylene and mixtures thereof.

8. The film of claim 2 wherein the LLDPE has a density ranging from about 0.916 to about 0.928.

9. The film of claim 1 having a total thickness ranging from about 0.2 to about 2 mil.

10. The film of claim 1 having a total thickness ranging from about 0.3 to about 1.5 mil.

11. The film of claim 1, wherein the thickness of each layer is at least about 0.1 mil.

12. The film of claim 1 wherein the LLDPE resin is a copolymer of ethylene and octene-1.

13. The film of claim 1 wherein the tackifier is polyisobutylene.

* * * * *